(12) United States Patent
Bicheler et al.

(10) Patent No.: US 12,349,625 B2
(45) Date of Patent: Jul. 8, 2025

(54) HANDLE FOR A HAND-GUIDED POWER TOOL AND TRIMMER

(71) Applicant: Andreas Stihl AG & Co. KG, Waiblingen (DE)

(72) Inventors: Liv Bicheler, Kernen i. R. (DE); Roland Mandel, Stuttgart (DE); Simon Haug, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 78 days.

(21) Appl. No.: 18/522,306

(22) Filed: Nov. 29, 2023

(65) Prior Publication Data

US 2024/0099190 A1 Mar. 28, 2024

Related U.S. Application Data

(62) Division of application No. 17/219,979, filed on Apr. 1, 2021, now Pat. No. 11,864,493.

(30) Foreign Application Priority Data

Apr. 9, 2020 (EP) .................................. 20169021

(51) Int. Cl.
*A01D 34/90* (2006.01)
(52) U.S. Cl.
CPC ...... *A01D 34/902* (2013.01); *A01D 2034/907* (2013.01)
(58) Field of Classification Search
CPC ............................ A01D 34/902; A01D 34/905
USPC ............................................. 30/275.4–277.4
See application file for complete search history.

(56) References Cited

U.S. PATENT DOCUMENTS

| | | |
|---|---|---|
| 4,006,528 A | 2/1977 | Katsuya |
| D297,906 S | 10/1988 | Abelsson et al. |
| D389,706 S | 1/1998 | Haberlein et al. |
| 5,765,445 A | 6/1998 | Miyata |
| D413,784 S | 9/1999 | Tsai |
| 5,979,015 A | 11/1999 | Tamaribuchi |
| 6,021,630 A | 2/2000 | Higashi et al. |
| 6,176,016 B1 | 1/2001 | Higashi et al. |

(Continued)

FOREIGN PATENT DOCUMENTS

| | | |
|---|---|---|
| CN | 208 242 227 | 12/2018 |
| CN | 109 334 953 | 2/2019 |

(Continued)

*Primary Examiner* — Adam J Eiseman
*Assistant Examiner* — Richard D Crosby, Jr.
(74) *Attorney, Agent, or Firm* — Gudrun E. Huckett

(57) ABSTRACT

A power tool handle has a shaft with a fastening end securing the handle on the power tool and with a free end. The handle has an outer side for supporting a palm of a hand. First and second operating elements are pivotably supported at the shaft about first and second pivot axes, respectively. The first operating element controls a power tool drive motor. In non-actuated position, the second operating element prevents a control action of the first operating element and has an actuating section projecting from the shaft and having a first and a second end. The first end is closer to the fastening end of the shaft than the second end. The second end is closer to the free end of the shaft. The second pivot axis is closer to the first end than to the second end. A trimmer is provided with such a handle.

18 Claims, 8 Drawing Sheets

(56) References Cited

U.S. PATENT DOCUMENTS

| | | | |
|---|---|---|---|
| 6,591,507 B2 | 7/2003 | Kobayashi et al. | |
| D487,216 S | 3/2004 | Arvidsson et al. | |
| 6,823,591 B2 * | 11/2004 | Kobayashi | F02B 63/02 |
| | | | 30/277.4 |
| 6,880,251 B2 | 4/2005 | Gambert | |
| 7,201,144 B2 | 4/2007 | Yuasa | |
| D600,515 S | 9/2009 | Tinius | |
| 7,584,804 B2 | 9/2009 | Fukuzumi et al. | |
| D625,970 S | 10/2010 | Tinius | |
| 8,042,220 B2 * | 10/2011 | Hittmann | B25F 5/026 |
| | | | 15/327.5 |
| 8,127,455 B2 | 3/2012 | Wenckel et al. | |
| 8,151,471 B2 | 4/2012 | Tomiyama et al. | |
| D690,569 S | 10/2013 | Tinius | |
| D692,287 S | 10/2013 | Tinius | |
| 8,667,648 B2 | 3/2014 | Vierck | |
| 9,049,816 B2 | 6/2015 | Ito et al. | |
| 9,120,528 B2 | 9/2015 | Badollet | |
| 9,782,884 B2 | 10/2017 | Ota et al. | |
| 9,931,746 B2 * | 4/2018 | Rader | A01D 34/902 |
| D825,296 S | 8/2018 | Ahearn | |
| 10,206,329 B2 | 2/2019 | Alexandersson et al. | |
| 10,448,552 B2 | 10/2019 | Ahearn | |
| 10,639,514 B2 | 5/2020 | Weck | |
| D907,978 S | 1/2021 | Schaefer et al. | |
| 11,026,367 B2 | 6/2021 | Honglei et al. | |
| 11,027,408 B2 | 6/2021 | Rizzo | |
| D954,425 S | 6/2022 | Savioli | |
| 2003/0226262 A1 | 12/2003 | Gambert | |
| 2007/0067947 A1 | 3/2007 | Hittmann et al. | |
| 2009/0223017 A1 | 9/2009 | Hittmann et al. | |
| 2009/0229131 A1 | 9/2009 | Tomiyama et al. | |
| 2010/0012338 A1 | 1/2010 | Okabe et al. | |
| 2010/0313430 A1 | 12/2010 | Yamaoka et al. | |
| 2011/0030227 A1 | 2/2011 | Osawa et al. | |
| 2011/0203118 A1 | 8/2011 | Saito | |
| 2012/0167539 A1 * | 7/2012 | Ito | A01D 34/902 |
| | | | 56/255 |
| 2012/0168289 A1 | 7/2012 | Ito et al. | |
| 2012/0180322 A1 * | 7/2012 | Takeda | F01M 11/0004 |
| | | | 123/196 CP |
| 2012/0279743 A1 * | 11/2012 | Suda | A01D 34/90 |
| | | | 173/176 |
| 2013/0025136 A1 | 1/2013 | Whited et al. | |
| 2014/0075693 A1 | 3/2014 | Maslow et al. | |
| 2014/0174772 A1 | 6/2014 | Mandalka et al. | |
| 2015/0135884 A1 | 5/2015 | Watanabe et al. | |
| 2015/0357853 A1 * | 12/2015 | Suzuki | H02P 29/00 |
| | | | 318/139 |
| 2017/0297192 A1 | 10/2017 | Ou | |
| 2018/0020817 A1 | 1/2018 | Wedlock | |
| 2020/0009672 A1 | 1/2020 | Wu | |
| 2021/0315157 A1 * | 10/2021 | Bicheler | A01D 34/902 |

FOREIGN PATENT DOCUMENTS

| | | |
|---|---|---|
| CN | 110402672 | 11/2019 |
| DE | 20 2016 106 165 | 12/2016 |
| EP | 2 687 078 | 1/2014 |
| EP | 2 845 460 | 3/2015 |
| JP | 2013-078268 | 5/2013 |
| WO | 2019/075333 | 4/2019 |
| WO | 2019/206875 | 10/2019 |

* cited by examiner

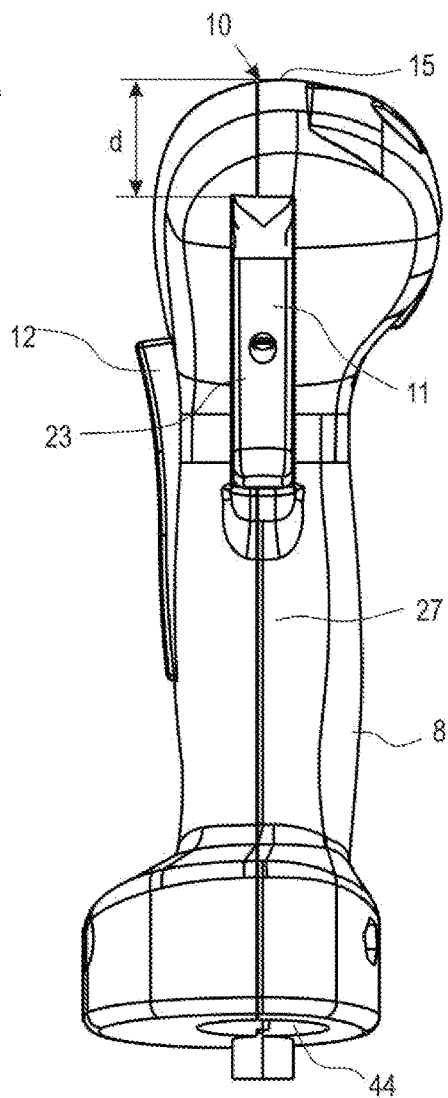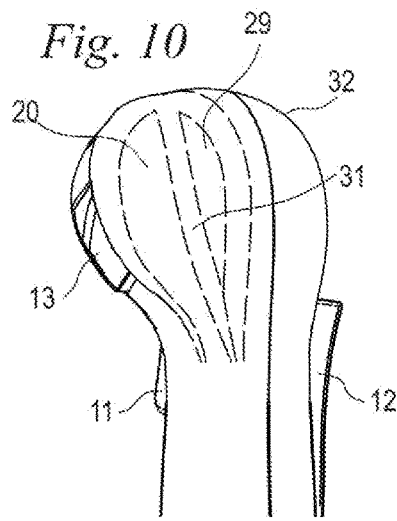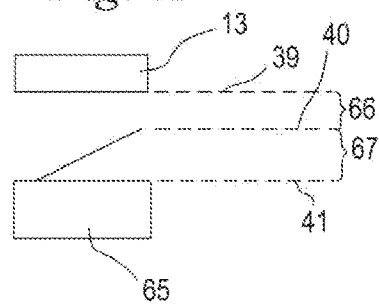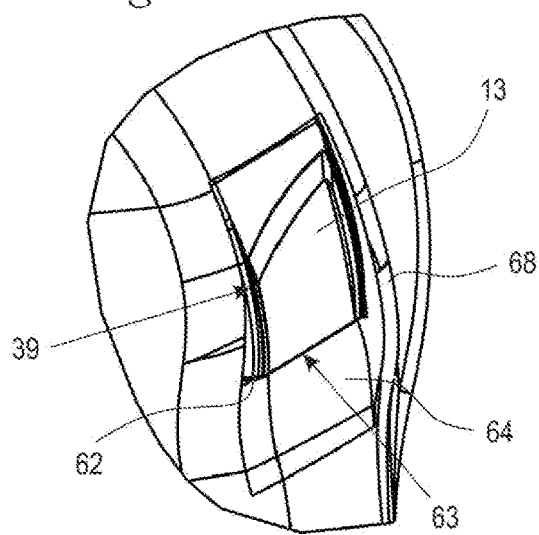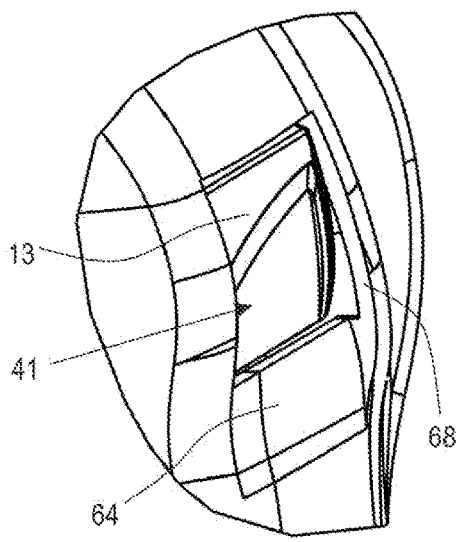

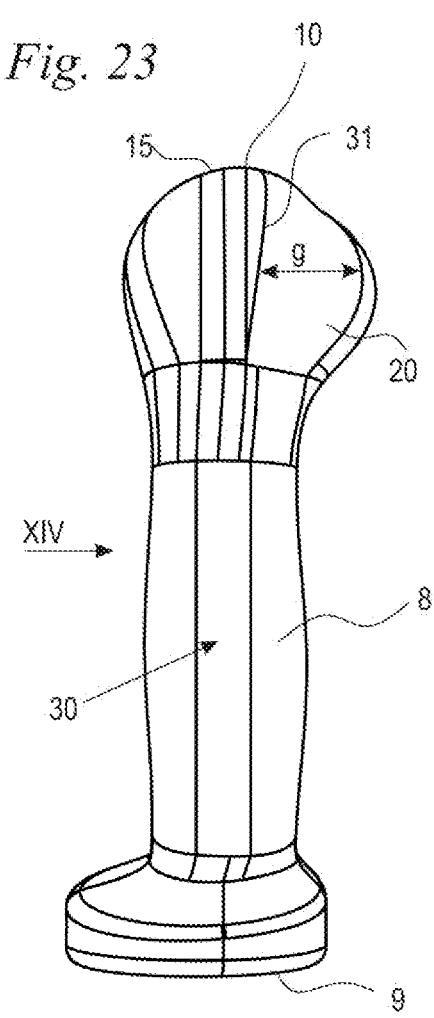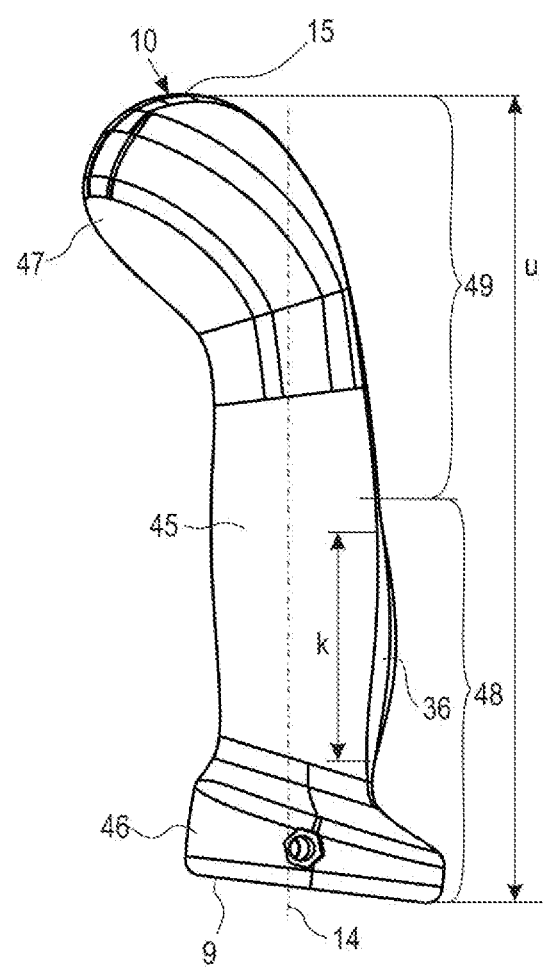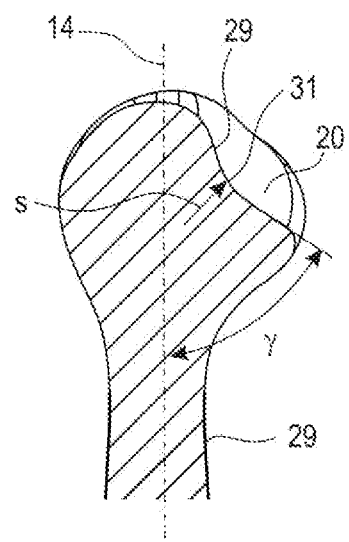

HANDLE FOR A HAND-GUIDED POWER TOOL AND TRIMMER

CROSS-REFERENCE TO RELATED APPLICATIONS

This application is a divisional application of U.S. patent application Ser. No. 17/219,979 having a United States filing date 04/01/2021, the aforesaid United States application claiming a priority date of Apr. 9, 2020 based on prior filed European patent application No. 20 169 021.1, the entire contents of the aforesaid United States application and of the aforesaid European patent application being incorporated herein by reference.

BACKGROUND OF THE INVENTION

The invention relates to a handle for a hand-guided power tool and to a trimmer.

EP 2 845 460 A1 discloses a trimmer that is provided at its guide tube with a handlebar carrying two handles. One handle carries the operating elements and one of the operating elements is arranged at the inner side of the handle.

In operation, the guiding forces for guiding the tool must be introduced via the handle or handles. In this context, forces may have to be introduced in different directions. For mowing with a trimmer, the tool must be moved back and forth. However, it can also be necessary to push or press the tool into a work piece.

It is an object of the invention to provide a handle for a hand-guided power tool with which the introduction of guiding forces is ergonomically possible in a force-saving way. A further object of the invention resides in providing a trimmer that enables working in an ergonomic and force-saving way.

SUMMARY OF THE INVENTION

In accordance with the invention, this object is achieved in respect to the handle for a hand-guided power tool by a handle comprising a shaft that comprises a fastening end at which the handle is secured and further comprises a free end, wherein the handle comprises an outer side that is provided to at least partially be in contact with a palm of a hand of a user, wherein the handle comprises an inner side oppositely positioned to the outer side, wherein the handle comprises a longitudinal axis, wherein at the inner side of the handle a thumb support surface is arranged which, in a side view perpendicular to the inner side, is positioned in relation to the longitudinal axis at an angle of at least 20° and at most 70° at every point of the thumb support surface.

In regard to the trimmer, the object is solved by a trimmer with a guide tube wherein at one end of the guide tube a tool unit is arranged, wherein at the guide tube a bar of a handlebar is secured that carries a handle at each end, wherein each handle comprises a shaft that comprises a fastening end at which the handle is connected to the bar of the handlebar and further comprises a free end, wherein each handle comprises a front side positioned so as to face the tool unit and further comprises an oppositely positioned rear side, wherein the handles comprise inner sides positioned to face each other and further comprise outer sides facing away from each other, wherein at the inner side of at least one of the handles a thumb support surface is arranged which, in a side view perpendicular to the inner side, is positioned in relation to the longitudinal axis at an angle of at least 20° and at most 70° at every point of the thumb support surface.

It is provided that at the inner side of the handle a thumb support surface is arranged which, in a side view perpendicular to the inner side, is positioned in relation to the longitudinal axis of the handle at an angle of at least 20° and at most 70° at every point of the thumb support surface. Due to this incline of the thumb support surface, on the one hand, an ergonomic hand position of the thumb is provided. On the other hand, in particular when pushing and pressing a tool, for example, a blade of a trimmer, forces can be introduced very well into the tool by means of the thumb support surface. The forces that must be applied by the operator when pushing and pressing the tool must not only be generated by the palm of the hand but also by the thumb. In this context, in particular the introduction of force components in the direction toward the fastening end of the handle is also possible in a force-saving and ergonomic manner.

The thumb support surface is advantageously formed as a top side of an elevation arranged at the inner side of the shaft. The thumb support surface projects advantageously laterally in relation to an approximately straight course of the inner side. Alternatively, the thumb support surface can be designed as a bottom of a depression provided at the inner side. A combination of elevation and depression may also be provided.

The thumb support surface is preferably a comparatively flat surface. The thumb support surface is positioned between two planes that extend parallel to each other. The distance of the two planes relative to each other amounts advantageously to less than 3 mm, in particular less than 2 mm. The thumb support surface comprises a length of at least 2.5 cm and a width of at least 8 mm. The length and the width of the thumb support surface provided in this context refer to the maximum length and the maximum width. In the regions which are located outside of the two parallel extending planes, the thumb support surface passes advantageously with an adjusted curvature into the inner side and the front side and/or rear side of the handle. The thumb support surface can be a flat surface. However, it can also be provided that the thumb support surface extends slightly curved. The radius of curvature of the thumb support surface in this context is preferably as large as possible in all directions. The curvature of the thumb support surface comprises advantageously a minimal radius that amounts to at least 10 mm, in particular at least 15 mm, advantageously at least 30 mm. The thumb support surface can be curved differently in different directions.

The thumb support surface is advantageously arranged at a distance in relation to the free end of the shaft. In an embodiment variant, the thumb support surface thus does not extend all the way to the free end of the shaft. The distance of the thumb support surface to the free end of the shaft amounts advantageously to at least 1 cm. This distance is in particular provided for a handle that carries no operating elements. Preferably, the distance of at least 1 cm of the thumb support surface in relation to the free end of the shaft is provided for a left handle. For a handle that carries at least one operating element, a smaller distance of the thumb support surface in relation to the free end can be advantageous.

Advantageously, the thumb support surface passes with a concave curvature into the inner side of the handle. In a section plane that extends parallel to the longitudinal axis of the handle and through the inner side, the thumb support surface is positioned in relation to the longitudinal axis advantageously at an angle that opens toward the fastening end. The thumb support surface advantageously descends in the direction toward the other hand of the user. In relation to the longitudinal axis, the thumb support surface advantageously ascends. In this way, an operator can place the thumb well onto the thumb support surface in lateral direction. Sliding the thumb on in longitudinal direction of the thumb support surface is not required. A slight ascend of the thumb support surface toward the other hand or a slight descend toward the longitudinal axis can however be advantageous also. The angle advantageously amounts to 30° to 110°, in particular 60° to 90°. Preferably, the angle is less than 90°. The angle at which the thumb support surface is positioned in relation to the longitudinal axis can vary in this context across the length of the thumb support surface.

Advantageously, the handle comprises at its fastening end a receptacle for pushing the handle onto the bar of a handlebar, for example. The longitudinal axis of the handle is advantageously the longitudinal center axis of the hollow receptacle. The longitudinal axis extends in push-on direction of the handle. It can also be provided that the handle at the fastening end and at the free end is made thicker or wider than the remainder of the handle, respectively, and that therebetween a grip section is extending that can be gripped by the operator with his fingers in operation. The longitudinal axis extends advantageously through the center of area of the grip section in section planes adjacent to the ends that are made thicker or wider.

It has been found that work with the hand-guided power tool is causing the operator to experience less fatigue when the hand position during the course of the work can be changed several times. In order to enable not only gripping around the shaft, but also a support of the hand, it is provided that the shaft with its free end provides a support surface for a hand of a user. Particularly preferred, the support surface passes by means of a continuously rounded portion into a rear side that is extending in circumferential direction of the shaft between the inner side and the outer side. Due to the continuously rounded portion, the hand of the operator can change continuously between different grip positions wherein the hand of the operator can be moved across the rounded portion from the rear side to the support surface and back. In this context, the rounded portion is advantageously embodied with a comparatively large radius in order to enable a disturbance-free gliding of the hand of the user. In a side view looking onto the outer side of the handle, the rounded portion advantageously comprises at every point thereof a radius of at least 1.5 cm, in particular of at least 2 cm.

The handle can be a handle that carries operating elements. Advantageously, at the shaft a first operating element is supported so as to be pivotable about a first pivot axis and a second operating element is supported so as to be pivotable about a second pivot axis. The first operating element is advantageously configured to control the drive motor and the second operating element prevents in a non-actuated position a control action on the drive motor through the first operating element. In an advantageous configuration, it can be provided that the second operating element in its non-actuated position mechanically locks the first operating element. However, it can also be provided that the second operating element enables pivoting of the first operating element but such that this pivoting action in the non-actuated position of the second operating element does not lead to a control action of the drive motor, for example, by providing a corresponding wiring of switches that are actuated by the operating elements or by providing a corresponding mechanical coupling.

The longitudinal axis of the handle is advantageously an axis that is positioned perpendicularly to the first pivot axis and perpendicularly to the second pivot axis. In a viewing direction in the direction of the longitudinal axis, the first pivot axis and the second pivot axis are advantageously positioned relative to each other at an angle of less than 180°, in particular an angle of less than 120°. Particularly preferred, the first and the second pivot axes, in viewing direction in the direction of the longitudinal axis of the handle, are positioned at an angle of approximately 90°. The two pivot axes are thus not positioned parallel to each other as is usually the case for operating elements which are arranged at oppositely positioned sides of the handle. In a particularly preferred configuration, the first operating element is arranged at the front side of the handle and the second operating element at the outer side of the handle. In this way, the second operating element can be actuated by the palm of the hand of the user.

The second operating element comprises advantageously an actuating section which is projecting in the non-actuated position from the shaft and which comprises a first end that is located closer to the fastening end and a second end that is located closer to the free end of the shaft. The second pivot axis is advantageously arranged closer to the first end of the actuating section than to the second end of the actuating section. Preferably, the second pivot axis is located closer to the fastening end than to the free end of the shaft. In this way, the second operating element carries out its greatest movement at the end that is located closer to the free end of the shaft. In this way, a safe actuation of the second operating element is possible even if the operator due to his selected hand position, for example, supporting the hand on the support surface, can reach and actuate the actuating section only at its second end. Due to the provided support of the second operating element, operating the power tool is therefore simplified in various hand positions. The actuating section of the second operating element projects advantageously at any point thereof no more than 3 mm past the outer contour of the shaft in the actuated position of the second operating element. In this way, the second operating element can be pushed comfortably by means of the palm of the hand. Upon change of the hand position at the handle, the actuating section effects no or only a minimal disturbance of the movement of the hand of the operator.

Advantageously, the first operating element in non-actuated position comprises an actuating section that is projecting from the shaft. The actuating section of the first operating element comprises advantageously a first end positioned closer to the fastening end and a second end positioned closer to the free end of the shaft. The first pivot axis in an advantageous embodiment is arranged closer to the second end of the actuating section of the first operating element than to the first end of the actuating section of the first operating element.

Advantageously, the actuating section of at least one operating element comprises a distance of less than 7 cm to the free end of the shaft. In this way, the corresponding operating element can be gripped by the operator when the hand of the operator is resting on a support section at the free end of the shaft. Particularly preferred, the actuating sections of both operating elements have, in relation to the free end of the shaft, a distance of less than 7 cm. In this way, both operating elements can be actuated by the operator when the hand of the operator is resting on the support section at the free end of the shaft. In order for both operating elements to be gripped by the operator in different hand positions, it is advantageously provided that the actuating section of the first operating element and the actuating section of the second operating element overlap across a length section of the shaft. The length of the length section of the shaft measured in the direction of the longitudinal axis amounts to advantageously at least 30%, in particular at least 50%, of the length of the actuating section of the first operating element measured in the same direction. Particularly advantageously, the actuating sections of the two operating elements at least partially overlap in a grip section of the shaft. The grip section of the shaft is in this context advantageously a section that is positioned between the two thicker and wider end regions of the shaft.

The first operating element is advantageously arranged at the front side of the handle extending in circumferential direction of the shaft between the inner side and the outer side and provided for being in contact with the fingers of a user. The second operating element is preferably arranged at the outer side.

In an advantageous embodiment, it is provided that the handle comprises a third operating element. The third operating element is preferably arranged at the inner side of the handle. The third operating element is provided in particular for actuation by a thumb of an operator. The first operating element is advantageously provided primarily for actuation by means of the index finger and/or middle finger of an operator. The third operating element comprises an actuating position in which the third operating element begins to carry out an actuating stroke upon movement from a non-actuated position into an actuated position. It can be provided that between the non-actuated position and the actuating position an idle stroke is provided for the third operating element. However, it can also be provided that the actuating position coincides with the non-actuated position of the operating element.

In the actuating position, the third operating element, in a viewing direction in the direction of the longitudinal axis toward the fastening end of the shaft, projects advantageously by at most 1 mm past the outer contour of the handle. The third operating element, in viewing direction perpendicular to the thumb support surface, is positioned in particular behind the outer contour of the handle, i.e., is covered by the shaft. In this way, an accidental actuation of the third operating element is avoided in case the hand of the operator is resting on the support surface. In the non-actuated positions, the third operating element advantageously projects at least at one side, in particular at its side which is facing the fastening end, past the contour of the shaft.

The thumb support surface, which is arranged at the inner side of at least one of the handles and which, in a side view perpendicular to the inner side, is positioned at every point thereof at an angle of at least 20° and at most 70° in relation to the longitudinal axis, is particularly advantageously provided for a trimmer with a guide tube wherein at one end of the guide tube a tool unit is arranged and wherein at the guide tube a bar of a handlebar is secured which carries a handle at each end.

Due to the thumb support surface provided at least at one of the handles, movements for pushing and pressing the tool can be introduced well into the handles and from there into the tool unit by the supplemental action through the thumb support surface.

In a particularly preferred configuration, both handles of the trimmer comprise a thumb support surface at their inner side.

BRIEF DESCRIPTION OF THE DRAWING

Embodiments of the invention will be explained in the following with the aid of the drawing.

FIG. 9 is a side view in the direction of arrow IX-IX in FIG. 3 looking at the front side of the handle.

FIG. 10 is a perspective schematic illustration of the thumb support surface of the handle.

FIG. 11 is a schematic illustration of the actuation path of the third operating element of the handle.

FIG. 12 is a perspective illustration of the third operating element in non-actuated position.

FIG. 13 is a perspective illustration of the third operating element in actuated position.

FIG. 23 is a side view of the rear side of the second handle viewed in the direction of arrow XXIII in FIG. 19.

FIG. 24 is a side view in the direction of arrow XXIV in FIG. 23 looking at the outer side of the handle.

FIG. 25 is a detail section illustration of the thumb support surface along the line XXV-XXV in FIG. 19.

DESCRIPTION OF THE PREFERRED EMBODIMENTS

Figure 1:
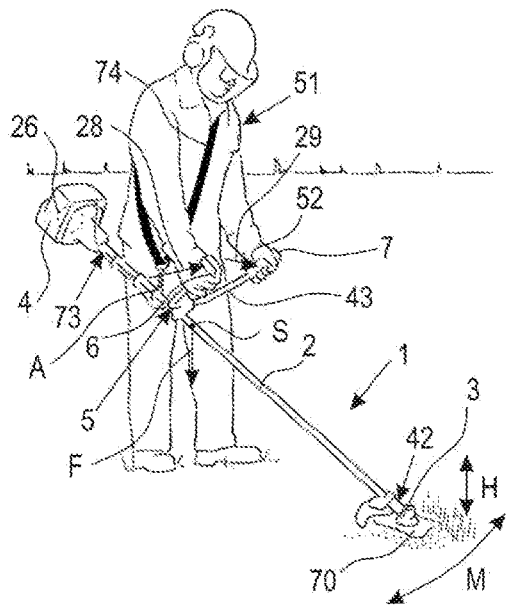
FIG. 1 is a schematic perspective illustration of an operator with a trimmer.

FIG. 1 shows schematically a user 51 who carries a hand-held power tool, i.e., a trimmer 1. The trimmer 1 comprises a guide tube 2. At one end 42 of the guide tube 2, a tool unit 3 is arranged, in the embodiment a tool head with a cutting blade 70. At the other end 73 of the guide tube 2, a housing 4 is arranged. In the embodiment, a schematically illustrated drive motor 26 is arranged in the housing 4. The drive motor 26 can be, for example, an electric motor, in particular an electric motor supplied with energy by a rechargeable battery, or an internal combustion engine.

The hand-guided power tool can also be a different kind of hand-guided power tool, for example, a blower. The hand-guided power tool can be in particular a power tool that has a handlebar. The hand-guided power tool can be in particular a blower, in particular a backpack-type blower.

The operator 51 carries the trimmer 1 by means of a carrying strap 74. By means of the carrying strap 74, the weight of the trimmer 1 in operation is at least partially, in particular mostly, absorbed. The carrying strap 74 holds the trimmer 1 at a suspension point A. The trimmer 1 is advantageously suspended at the carrying strap 74 such that the trimmer 1 is freely suspended from the carrying strap 74 in a work position, i.e., in a position in which the tool unit 3 is arranged lower than the housing 4. In FIG. 1, the center of gravity S of the trimmer 1 and the weight force F are illustrated schematically. In relation to the suspension point A, the center of gravity S of the trimmer 1 is displaced advantageously in the direction toward the tool unit 3. In this way, the trimmer 1 is suspended from the carrying strap 74 such that the tool unit 3 is arranged lower than the housing 4 of the trimmer 1.

For guiding the trimmer 1, a handlebar 5 is secured at the guide tube 2. In particular the forces for moving forward the tool in operation are introduced by means of the handlebar 5. The forward movement can be, for example, a back-and-forth movement when mowing or an up-and-down striking movement in a chopping operation. The movement direction during mowing is schematically illustrated in FIG. 1 by the double arrow M and the movement direction for the chopping operation is indicated by the double arrow H.

The handlebar 5 is a so-called bike handle. The handlebar 5 comprises a bar 43. The bar 43 extends preferably approximately transversely to the guide tube 2. At the ends of the bar 43, a handle 6 and a handle 7 are arranged, respectively. The handles 6, 7 comprise inner sides 29 which are arranged facing each other. The handles 6, 7 comprise outer sides 28 which are facing away from each other. The outer sides 28 of the handles 6 and 7 are in contact with the palm 52 of the hand of the user 51. The inner sides 29 are thus the sides of the handles 6 and 7 which are close to each other and the outer sides 28 are the sides of the handles 6 and 7 which are remote from each other.

FIGS. 2 to 18 show the first handle 6, in the embodiment the right handle. FIGS. 19 to 25 show the second handle 7 which forms the left handle of the trimmer 1 in the embodiment. The handles 6 and 7 can also be used in other hand-guided power tools, in particular in blowers, sprayers and the like.

Figure 2:
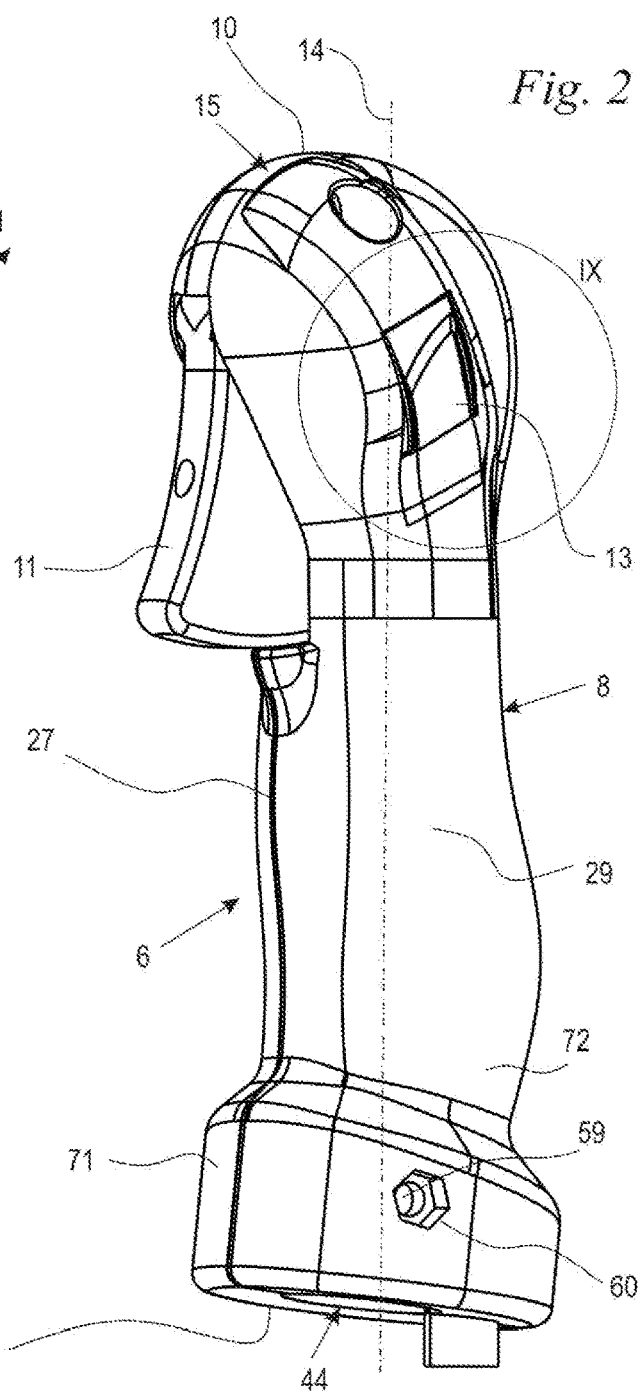
FIG. 2 is a perspective illustration of a first handle of the trimmer of FIG. 1.
Figure 5:
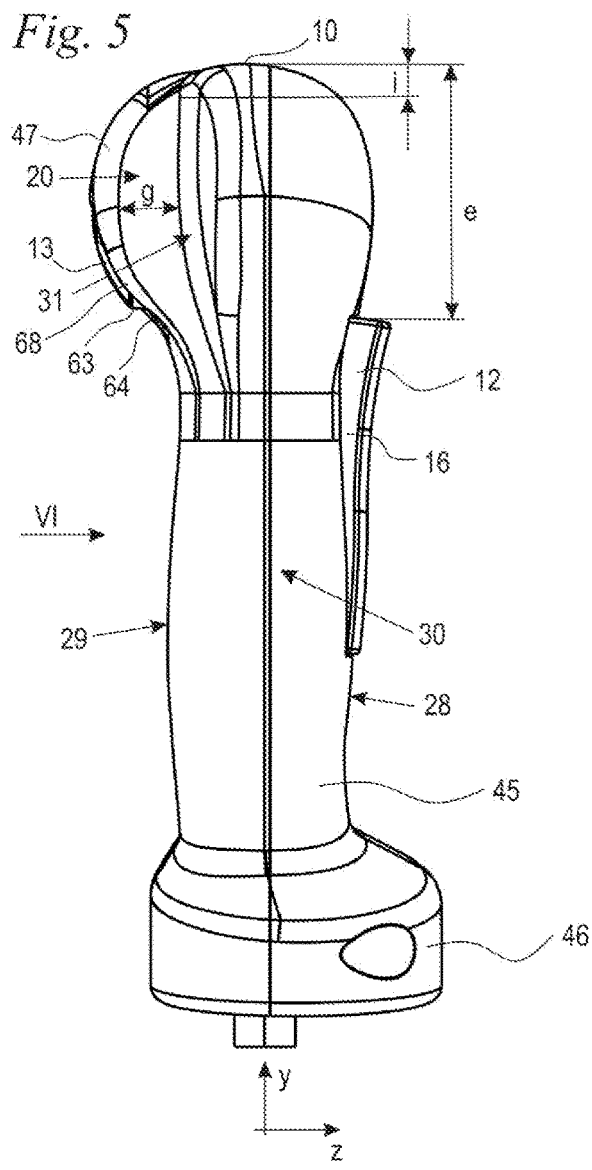
FIG. 5 is a side view in the direction of the arrow V in FIG. 3 looking at the rear side of the handle.

As shown in FIG. 2, the first handle 6 comprises a shaft 8. The shaft 8 comprises a fastening end 9 as well as a free end 10. In the usual working position mounted on a trimmer 2, the free end 10 faces upwardly and forwardly. In the embodiment, at the fastening end 9 a receptacle 44 is formed into which the bar 43 can be inserted. The center axis of the receptacle 44 coincides advantageously with the longitudinal axis 14 of the handle 6. The shaft 8 of the handle 6 in the embodiment is comprised of two half shells 71 and 72 which are resting against each other in a separation plane parallel to the longitudinal axis 14. The first handle 6 comprises a front side 27 which extends between the outer side 28 and the inner side 29. The front side 27 is provided for being in contact with the fingers of a hand of the user 51. In addition, the handle 6 comprises a rear side 30 which is illustrated in FIG. 5 and which is arranged opposite the front side 27. In the usual working position in case of a trimmer, the rear side 30 is facing the operator and the front side 27 is facing in the direction toward the work unit 3.

Figure 3:
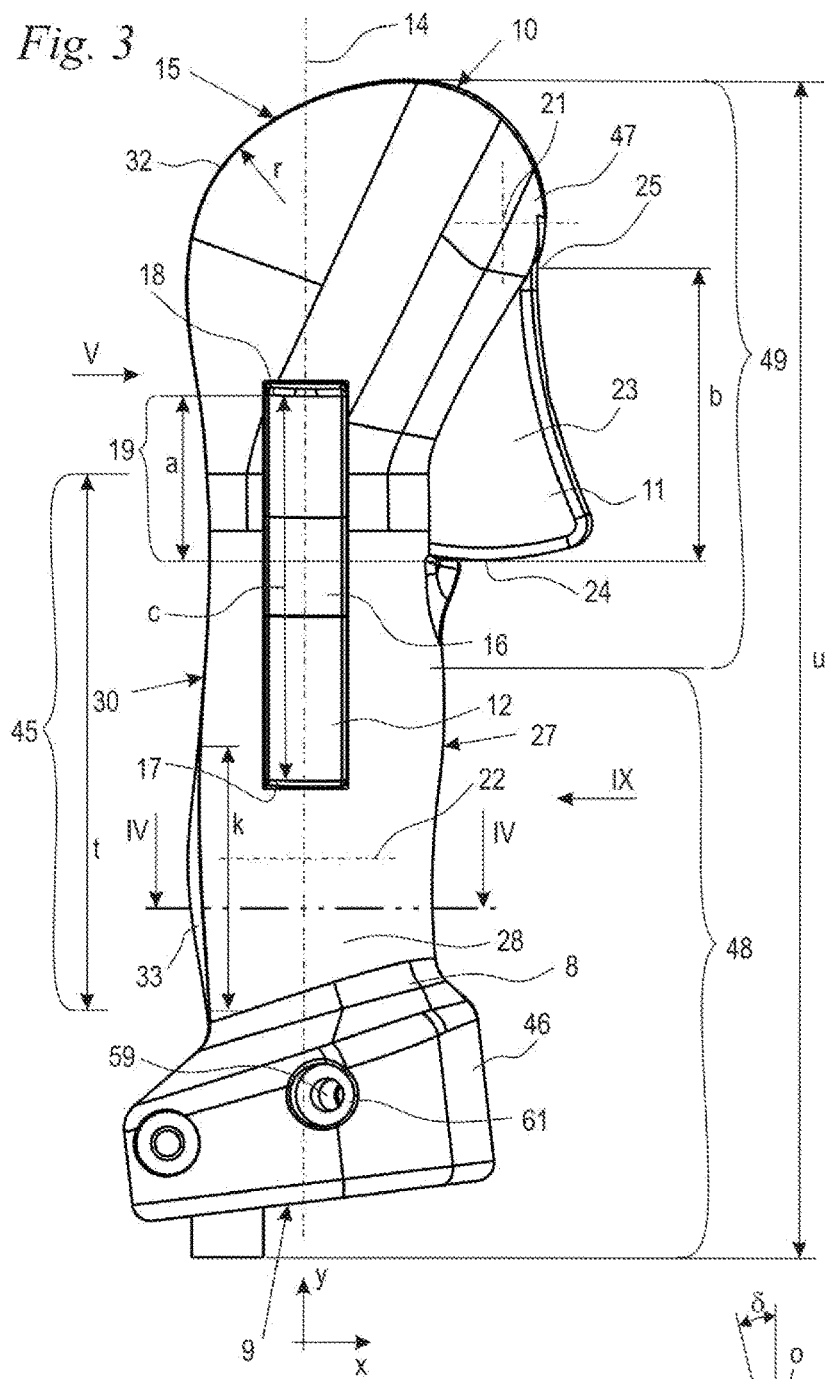
FIG. 3 is a side view of the outer side of the handle of FIG. 2.

For fixation of the handle 6 at the bar 43, advantageously a fastening screw, not illustrated, is provided that projects through a fastening opening 59 provided in the handle 6. The fastening screw penetrates advantageously openings in the bar 43 and secures in this way the position of the handle 6 in relation to the bar 43. In FIG. 2, a receptacle 60 for a fastening nut is illustrated. As illustrated in FIG. 3, the oppositely positioned outer side 28 comprises a receptacle 61 for a fastening screw that is to be screwed into the fastening nut on the opposite side of the handle 6.

As also shown in FIG. 2, at the free end 10 of the handle 6 a support surface 15 for a hand of a user 51 is formed. The support surface 15 is rounded and in regard to its size is matched to the palm of a hand of a user. The first handle 6 comprises also a first operating element 11, as shown in FIG. 2, as well as a second operating element 12 (see FIG. 3) and a third operating element 13 (FIG. 2).

The second operating element 12 that is also arranged at the first handle 6 is illustrated in FIG. 3. The shaft 8 forms an elongate base member of the first handle 6 at which the operating elements 11, 12, and 13 are supported. The first operating element 11 is advantageously configured to control the drive motor 26. By means of the first operating element 11, in particular the rotary speed of the drive motor 26 and thus the rotary speed of the tool can be adjusted. The second operating element 12 can advantageously prevent in a non-actuated position a control action of the drive motor 26 by means of the first operating element 11, for example, by blocking the first operating element 11. The third operating element 13 can be, for example, a stop switch. Other functions of the operating elements 11, 12, and 13 can however be advantageous also.

As shown in FIG. 3, the first operating element 11 projects with an actuating section 23 from the shaft 8 at the front side 27. The actuating section 23 is the entire section of the first operating element 11 that projects from the shaft 8 in the non-actuated position of the first operating element 11. The first operating element 11 is pivotably supported so as to pivot about a first pivot axis 21. The first pivot axis 21 is positioned closer to the free end 10 of the handle 6 than the actuating section 23. The actuating section 23 of the first actuating element 11 comprises a first end 24 and a second end 25. The first end 24 is positioned closer to the fastening end 9 than the second end 25. The pivot axis 21 is positioned closer to the second end 25 of the actuating section 23 than to the first end 24. In the direction of the longitudinal axis 14, the pivot axis 21 is positioned closer to the free end 10 than the second end 25 of the actuating section 23. The actuating section 23 of the first actuating element 11 has a length b that is measured in the direction of the longitudinal axis 14.

The second operating element 12 comprises an actuating section 16 that projects from the shaft 8. The actuating section 16 is the entire section of the second operating element 12 which projects from the shaft 8 in the non-actuated position of the second operating element 12. The actuating section 16 has a length c measured in the direction of the longitudinal axis 14 (FIG. 3). The lengths b and c can be approximately of the same size. The length b is smaller than the length b in the embodiment.

The actuating section 16 of the second operating element 12 comprises a first end 17 and a second end 18. The first end 17 is positioned closer to the fastening end 9 than the second end 18. Both actuating sections 16 and 23 are aligned in the direction of the longitudinal axis 14. The second actuating element 12 is pivotably supported so as to pivot about a pivot axis 22. The pivot axis 22 is positioned closer to the first end 17 than to the second end 18 of the actuating section 16. In the embodiment, the first end 17 comprises a larger distance to the fastening end 9 in the direction of the longitudinal axis 14 than the pivot axis 22. In the embodiment, the pivot axis 22 is positioned between the first end 17 and the fastening end 9 in the direction of the longitudinal axis 14.

The actuating sections 23 and 16 overlap in a length section 19 in non-actuated position of the operating elements 11 and 12. The length section 19 in which both the actuating section 23 and the actuating section 16 are extending has a length a measured in the direction of the longitudinal axis 14. The length a amounts advantageously to at least 30% of the length b of the actuating section 23 of the first operating element 11. Preferably, the length a amounts to at least 50% of the length b.

The shaft 8 of the first handle 6 comprises a grip section 45. The grip section 45 comprises an elongate shape that is cylindrical in coarse approximation. In the direction toward the fastening end 9, a thicker or wider section 46 adjoins the grip section 45. In the direction toward the free end 10, a thicker or wider section 47 adjoins the grip section 45. The length t of the grip section 45 measured in the direction of the longitudinal axis 14 amounts advantageously to a value of one fourth to three fourths of the total length u of the handle 6. In this context, the total length u is measured parallel to the longitudinal axis 14.

The handle 6 comprises a first half 48 which extends from the fastening end 9 across half the length u. The handle 6 comprises in addition a second half 49 which adjoins the first half 48 and extends to the free end 10. The second half 49 extends across half the length u. The grip section 45 is at least partially arranged in the first half 48. In the embodiment, the grip section 45 extends across at least 60% of its length tin the first half 48. The grip section 45 projects also into the second half 49. In the embodiment, the overlap region 19 is arranged completely in the second half 49. It can also be provided that the overlap region 19 extends partially into the first half 48.

The support surface 15 passes across a rounded portion 32 into the rear side 30. The rounded portion 32 is convexly embodied and extends in a rounded shape in the embodiment. The radius r of the rounded portion 32 amounts to at least 1.5 cm, in particular at least 2 cm, at every point thereof in a side view onto the outer side 28 shown in FIG. 3. Particularly advantageous is a radius r of at least 3 cm. The radius r can vary across the course of the rounded portion 32. By means of the rounded portion 32, a uniform transition from the rear side 30 to the support surface 15 is achieved. The hand of the user 51 can glide along easily about the rounded portion 32. Due to the rounded shape of the rounded portion 32, an approximately continuous distance to the oppositely positioned first operating element 11 can be maintained in this context. In this way, it can be ensured that the user 51 can grip the operating element 11 in every intended hand position.

The shaft 8 comprises a heel of hand support 33. The heel of hand support 33 is advantageously arranged at the grip section 45. As shown in FIG. 3, the heel of hand support 33 comprises a length k measured parallel to the longitudinal axis 14. The length k advantageously amounts to at least 2.5 cm, in particular at least 3.5 cm. In the embodiment, the heel of hand support 33 extends into close proximity to the thicker or wider section 46.

Figure 4:
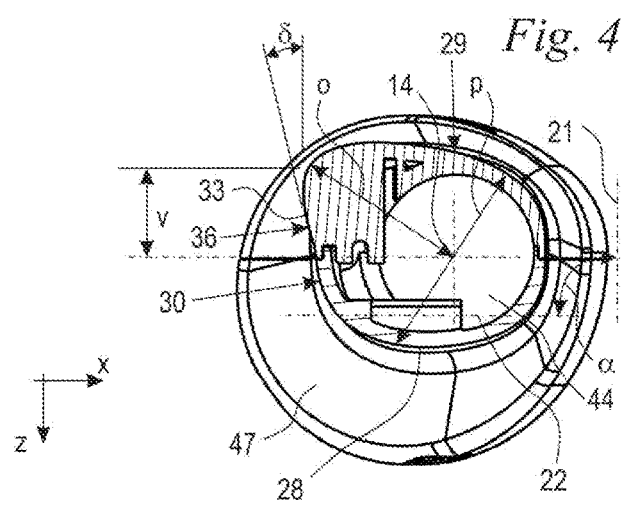
FIG. 4 is a section of the handle in the direction of the line IV-IV in FIG. 3.

FIG. 4 shows a section through the handle 6 in the region of the heel of hand support 33. The section extends perpendicularly to the longitudinal axis 14. The heel of hand support 33 is formed as an outwardly projecting elevation of the otherwise advantageously approximately round cross section of the grip section 45. The heel of hand support 33 extends in the embodiment at the inner side 29 and the rear side 30. The heel of hand support 33 has its largest radial extension approximately in the region in which the inner side 29 and the rear side 30 border each other. The heel of hand support 33 comprises a heel of hand support surface 36 which extends approximately flat. The heel of hand support surface 36 extends advantageously at the rear side 30. The heel of hand support 33 comprises a maximum distance o in relation to the longitudinal axis 14. The section illustrated in FIG. 4 extends in the region in which the heel of hand support 33 comprises the maximum distance o in relation to the longitudinal axis 14. In the same section plane in which the maximum distance o is present, the handle 6 comprises a diameter p which is measured perpendicularly to the maximum distance o. The maximum distance o is advantageously larger than half the diameter p. The maximum distance o amounts advantageously to at least 0.7 times, in particular at least 0.8 times, the diameter p of the shaft 8.

As also shown in FIG. 4, the pivot axes 21 and 22 of the operating elements 11 and 12 are positioned perpendicularly to each other. The pivot axes 21 and 22 are positioned at an angle α to each other that is advantageously smaller than 180°. The angle α amounts to in particular less than 120°, preferably approximately 90°. In the embodiment, the pivot axes 21 and 22 define a coordinate system together with the longitudinal axis 14. The longitudinal axis 14 defines they direction of the coordinate system. They axis is oriented from the fastening end 9 to the free end 10. The pivot axis 21 of the first operating element 11 corresponds to the z axis, and the pivot axis 22 of the second operating element 12 corresponds to the x axis. The x axis is oriented from the rear side 30 toward the front side 27. The z axis is oriented from the inner side 29 toward the outer side 28. The axes x, y, and z form a clockwise rotation system. The heel of hand support 33 extends in negative z direction and negative x direction. The heel of hand support surface 36 is inclined at an angle δ in relation to the z direction wherein the angle advantageously at every point thereof is less than 45°, in particular less than 30°. The heel of hand support surface 36 comprises at a point thereof where the maximum distance o in relation to the longitudinal axis 14 is present a distance v measured in the z direction that corresponds advantageously to at least 0.3 times the diameter p.

Figure 6:
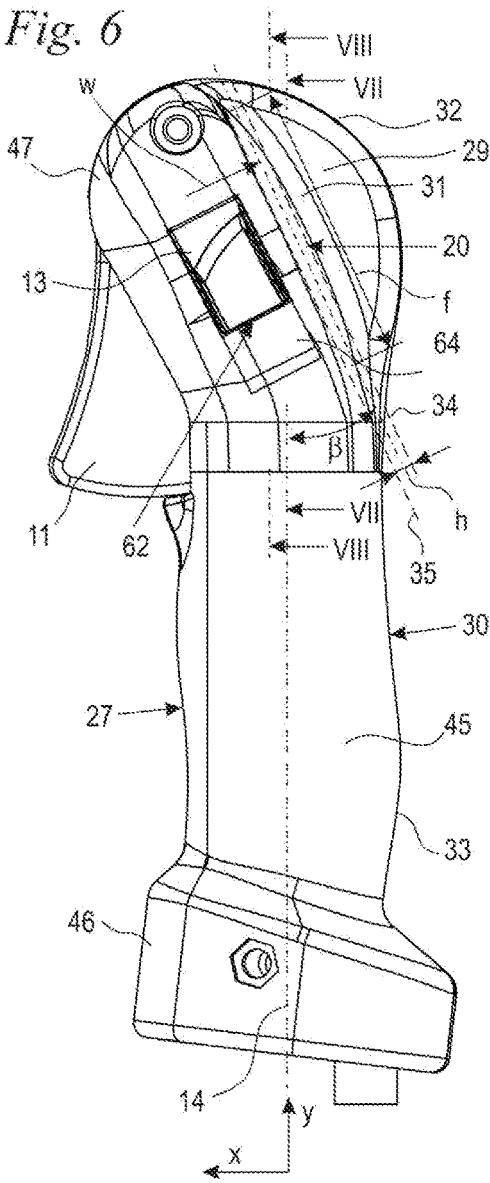
FIG. 6 is a side view in the direction of arrow VI in FIG. 5 looking at the inner side of the handle.

As illustrated in FIGS. 5 and 6, the first handle 6 comprises a thumb support surface 20. The thumb support surface 20 extends at the inner side 29 in the thicker or wider section 47. The thumb support surface 20 has a width g which is measured perpendicularly to the longitudinal axis 14. The thumb support surface 20 comprises a distance i in relation to the first end 10 which is measured in the direction of the longitudinal axis 14. The distance i can be very small for the first handle 6. The thumb support surface 20 can extend to a point close to the free end 10.

As illustrated in FIG. 5, the third operating element 13 is substantially or completely hidden in the illustrated side view in the direction of the x axis toward the rear side 30. The third operating element 13 is positioned in this viewing direction at least partially behind the thumb support surface 20. The third operating element 13 is covered by a cover 68. As illustrated in FIGS. 5 and 6, the third operating element 13 has a side 62 (FIG. 6) which is facing the fastening end 9. In the embodiment, the third operating element 13 is aligned approximately parallel to the thumb support surface 20. The side 62 extends at a slant to the longitudinal axis 14. Near the side 62, a recess 64 is formed at the handle 6; the recess 64 facilitates actuation of the third operating element 13 at the side 62. In respect to the recess 64, the third operating element 13 comprises a projecting portion 63 at the side 62. The projecting portion 63 has a length that amounts to advantageously at least 1 mm, in particular at least 2 mm. In this way, even with gloves a safe actuation of the operating element 13 at the side 62 is possible. As also illustrated in FIG. 5, the second operating element 12 comprises a distance e in relation to the free end 10 that is measured parallel to the longitudinal axis 14.

Figure 7:
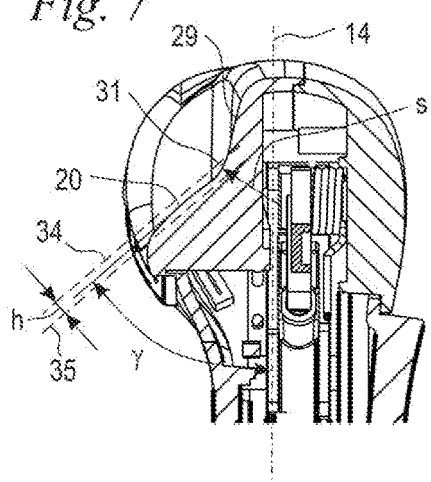
FIG. 7 is a detail section illustration along the line VII-VII in FIG. 6.
Figure 8:
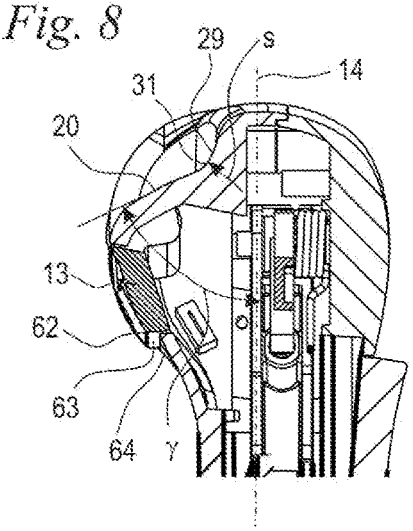
FIG. 8 is a detail section illustration along the line VIII-VIII in FIG. 6.

In FIGS. 6 to 8, the orientation of the thumb support surface 20 is illustrated. As shown in FIG. 6, the thumb support surface 20 is slanted at an angle β in relation to the longitudinal axis 14 in a viewing direction toward the inner side 29, i.e., in a viewing direction in the direction of the z axis. The angle β amounts to at least 20° and at most 70° at every point of the thumb support surface 20. In this way, on the one hand, an ergonomic hand position is achieved. On the other hand, due to the orientation of the thumb support surface 20, a very good introduction of forces to the tool unit 3 (FIG. 1) is possible so that beneficial force conditions are provided in particular for pushing and pressing the tool.

In the side view illustrated in FIG. 6, the thumb support surface 20 is preferably convexly curved. A configuration that is planar or concavely curved can however be advantageous also. The thumb support surface 20 is positioned between two parallel planes 34 and 35. The planes 34 and 35 extend advantageously at a slant in relation to the plane of the drawing sheet. The planes 34 and 35 do not extend parallel to any of the axes x, y, z of the coordinate system of the handle 6. The planes 34 and 35 are illustrated therefore schematically in FIG. 6. The thumb support surface 20 is in this context advantageously embodied such that the distance h of the two planes 34 and 35 amounts to less than 3 mm, in particular less than 2 mm. The width g of the thumb support surface 20 amounts advantageously to at least 8 mm. The length f of the thumb support surface 20, which is illustrated in FIG. 6, amounts advantageously to at least 2.5 cm. Preferably, a length f of at least 3 cm, in particular of at least 4 cm, is provided. The length f and the width g are measured in this context in a region that is positioned between the planes 34 and 35. Surface sections that border the thumb support surface 20 and are positioned outside of the planes 34 and 35 are not considered part of the thumb support surface 20 in this context. The thumb support surface 20 comprises advantageously a curvature whose radius w at every point thereof amounts to at least 10 mm, preferably at least 15 mm, advantageously at least 30 mm. In the embodiment, the radius of the curvature at every point thereof amounts to at least 40 mm. Also, a flat configuration of the thumb support surface 20, i.e., an infinite radius, can be advantageous. The thumb support surface 20 passes with a curved portion 31 into the inner side 29 of the handle 6. The curved portion 31 is concavely shaped.

As illustrated in FIGS. 7 and 8, the thumb support surface 20 descends in a direction from the longitudinal axis 14 to the exterior. A slight ascend of the thumb support surface 20 in this direction can however be advantageous also. In a section plane which extends parallel to the longitudinal axis 14 and through the inner side 29, i.e., a section plane in the y-z plane, the thumb support surface 20 is positioned in relation to the longitudinal axis 14 at an angle γ which opens toward the fastening end 9. The angle γ advantageously amounts to 30° to 110°. Particularly preferred, the angle γ amounts to 45° to 90°. The angle γ is preferably smaller than 90°. In FIG. 8, also the projecting portion 63 of the third operating element 13 past the recess 64 can be seen well. FIGS. 7 and 8 show also the configuration of the concave curved portion 31. The curved portion 31 comprises a radius s which can be embodied to be comparatively small, namely smaller than 2 cm, in particular smaller than 1 cm. The radius s must not be continuously of the same size but can also vary, as illustrated in FIGS. 7 and 8.

As illustrated in FIG. 9, the actuating section 23 of the first operating element 11 comprises a distance d in relation to the free end 10. The actuating section 16 of the second operating element 12 comprises a distance e in relation to the free end 10 that is illustrated in FIG. 5. The distance e in the embodiment is greater than the distance d. The distances d and e amount advantageously to less than 7 cm. In this way, the operating elements 11 and 12 can be actuated by a user 51 even when the hand of the user 51 is resting on the support surface 15.

In FIG. 10, the configuration of the thumb support surface 20, the curved portion 31, and the inner side 29 bordering it are illustrated.

The third operating element 13 is arranged such that an accidental actuation of the third operating element 13 is avoided even when the operator places his hand onto the support surface 15 at the free end 10 of the shaft 8. As illustrated schematically in FIG. 11, the third operating element 13 can actuate, for example, a schematically illustrated switch 65. An actuation of a mechanical element can also be provided. The operating element 13 comprises a non-actuated position 39 illustrated schematically in FIG. 11 as well as an actuated position 41 in which the switch 65 is completely actuated. Between these positions 39 and 41, the operating element 13 can travel first across an idle stroke 66. While performing this idle stroke 66, the switch 65 is not actuated. An actuating stroke 67 follows the idle stroke 66; the switch 65 is pushed when the actuating stroke 67 is carried out. The position of the third operating element 13 in which the operating element 13 has moved across the idle stroke 66 and begins to carry out the actuating stroke 67 is presently referred to as actuating position 40 (FIG. 11). In order to prevent accidental actuation of the switch 65, the actuating position 40 is determinative at which the actuating stroke 67 begins. An actuation of the third operating element 13 within the idle stroke 66 is without effect on the function of the trimmer 1.

FIG. 12 shows the third operating element 13 in non-actuated position 39. The third operating element 13 in the embodiment is covered by the cover 68 in the direction toward the thumb support surface 20 and toward the free end 10. The cover 68 in this context is at least so large that the third operating element 13, in the viewing direction in the direction of the longitudinal axis 14 toward the fastening end 9, projects in the actuating position 40 by at most 1 mm past the outer contour of the handle 6, 7, i.e., past the cover 68.

FIG. 13 shows the third operating element 13 in actuated position 41. The operating element 13 in the embodiment is pushed in deeper into the shaft 8 than the recess 64 so that the recess 64 projects past the operating element 13 at the side 62. However, it can also be provided that the third operating element 13 ends flush with the bottom of the recess 64 or projects past it. An adjustment of the third operating element 13 from the non-actuated position 39 illustrated in FIG. 12 into the actuated position 41 illustrated in FIG. 13 is advantageously only possible, due to the cover 68, when the operator pushes actively on the operating element 13. An accidental actuation is avoided due to the cover 68.

Figure 14:
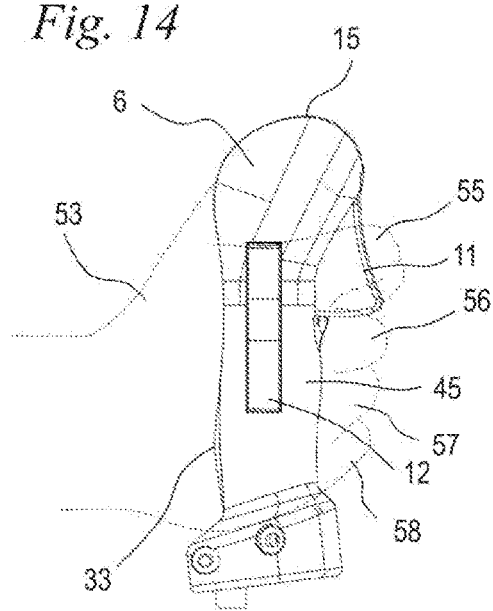
FIG. 14 is a schematic illustration of a possible hand position at the first handle.
Figure 15:
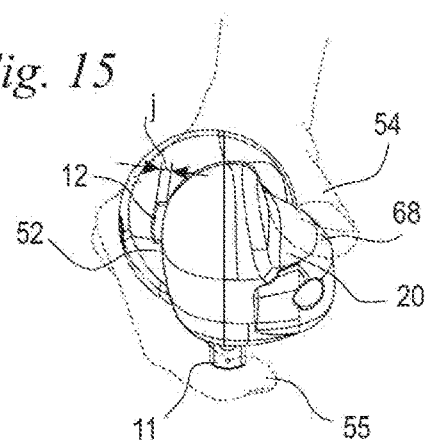
FIG. 15 is a schematic illustration of another possible hand position at the first handle.

FIGS. 14 to 18 show different possible grip positions for the handle 6. FIG. 14 shows the handle 6 schematically together with the hand 53 of the user 51 (FIG. 1). The hand 53 of the user 51 encloses the grip section 45. The heel of the hand is positioned on the heel of hand support 33. The palm 52 of the hand (FIG. 15) is resting on the second operating element 12 and actuates it. The index finger 55 is positioned at the first operating element 11 and can actuate the latter. The middle finger 56, the ring finger 57, and the little finger 58 encloses the grip section 45. For this hand position, two possible positions for the thumb 54 are provided. FIG. 15 shows an arrangement in which the thumb 54 is placed on the thumb support surface 20 and is supported thereon. In the position illustrated in FIG. 16, the thumb 54 is positioned below the thicker or wider section 47. The thumb 54 can surround the grip section 45 in this position. As illustrated in FIG. 15, the thumb 54 can however also actuate the third operating element 13. In this case, the thumb 54 is located below the thicker cover 68 (FIGS. 12 and 13).

Figure 16:
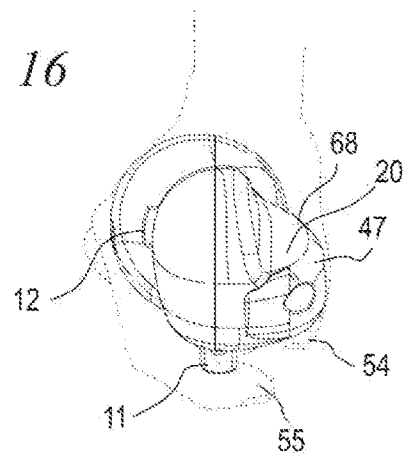
FIG. 16 is a schematic illustration of a yet another possible hand position at the first handle.

As illustrated in FIGS. 15 and 16 showing views in the direction of the longitudinal axis 14 toward the fastening end 9, the third operating element 13 in this viewing direction is completely hidden by the cover 68. The third operating element 13 cannot be seen in this view. The thumb support surface 20 is advantageously comparatively large. In the viewing direction in the direction of the longitudinal axis 14 toward the fastening end 9, the surface area of the thumb support surface 20 amounts to advantageously at least 10%, in particular at least 20%, preferably at least 25%, of the entire visible surface of the thicker section 47 of the first handle 6. Advantageously, the surface area of the thumb support surface 20 in the viewing direction in the direction of the longitudinal axis 14 toward the fastening end 9 amounts to less than 70%, in particular less than 50%, in particular less than 30%, of the entire visible surface of the thicker or wider section 47 of the first handle 6.

In FIG. 15, the second operating element 12 is illustrated in actuated position. In this position, the second operating element 12 advantageously projects only slightly or not at all past the outer contour of the shaft 8. In the embodiment, it is provided that the second operating element 12 in actuated position projects by a projecting length j past the outer contour of the shaft 8; the projecting length j amounts to at most 3 mm, in particular at most 2 mm. The projecting length j advantageously amounts to not more than 3 mm, in particular not more than 2 mm. at every point of the second operating element 12

Figure 17:
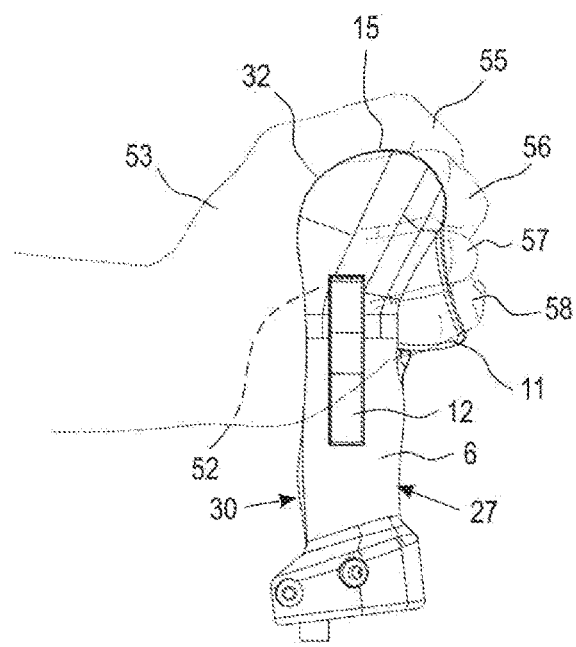
FIG. 17 is a schematic illustration of another possible hand position at the first handle.

FIG. 17 shows a hand position in which the hand 53 is partially supported at the support surface 15, namely advantageously with the inner side of the index finger 55. The middle finger 56 encloses the thicker or wider section 47. The ring finger 57 and the little finger 58 are positioned at the first operating element 11 and can actuate the latter. The palm 52 of the hand of the user 51 is arranged at the second operating element 12 and can actuate the second operating element 12.

Figure 18:
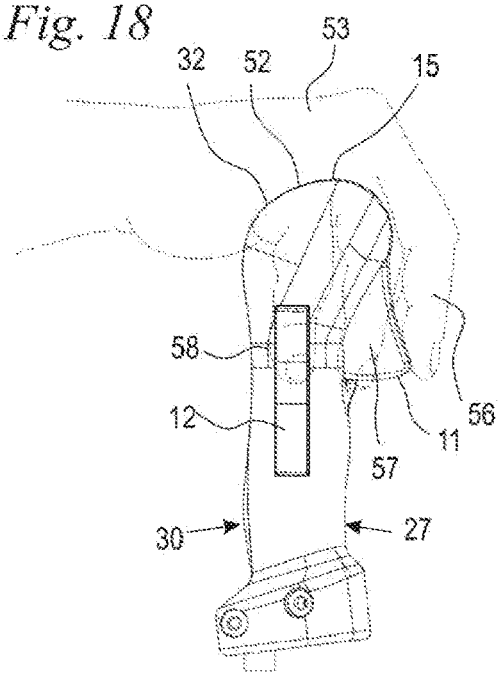
FIG. 18 is a schematic illustration of another possible hand position at the first handle.

In FIG. 18, a hand position is illustrated in which the palm 52 of the hand 53 is resting on the support surface 15. The second operating element 12 can be gripped with the little finger 58. The middle finger 56 is provided for actuation of the first operating element 11. Also, an actuation by means of the index finger 55 or the ring finger 57 may be preferred by the operator 51. Due to the distances d and e of the operating elements 11 and 12 of less than 7 cm in relation to the free end 10 (FIGS. 5 and 9), an actuation of the operating elements 11 and 12 is also possible without problem for the hand position illustrated in FIG. 18.

Due to the continuous rounded portion 32, the user 51 can change between the different hand positions in that the hand 53 is moved along the rounded portion 32. In this way, ergonomic working even over extended periods of time is possible.

FIGS. 19 to 25 show the configuration of the second handle 7. The second handle 7 is advantageously a left handle. The second handle 7 comprises no operating elements in the embodiment. In this way, the second handle 7 can be designed as a whole smaller than the first handle 6. The two handles 6 and 7 are shaped differently. However, the second handle 7, like the first handle 6, comprises a thumb support surface 20, a support surface 15 at the free end 10, and a heel of hand support surface 33. Same reference characters identify same or corresponding elements for the two handles.

Figure 20:
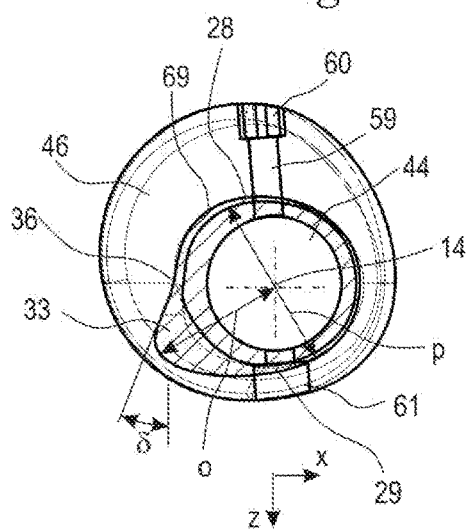
FIG. 20 is a section of a heel of hand support of the second handle along the line XX-XX in FIG. 19.

The second handle 7 also comprises a shaft 8 that comprises a fastening end 9 as well as a free end 10. A receptacle 44, not illustrated here, for the bar 43 is provided at the fastening end 9. Also, the second handle 7 comprises a longitudinal axis 14 which advantageously coincides with a y axis. The y axis is oriented from the fastening end 9 to the free end 10. An x axis extends from the rear side 32 to the front side 27. The z axis, as illustrated in FIG. 20, extends from the outer side 28 to the inner side 29. The axes x, y, z form a clockwise rotation system.

Figure 19:
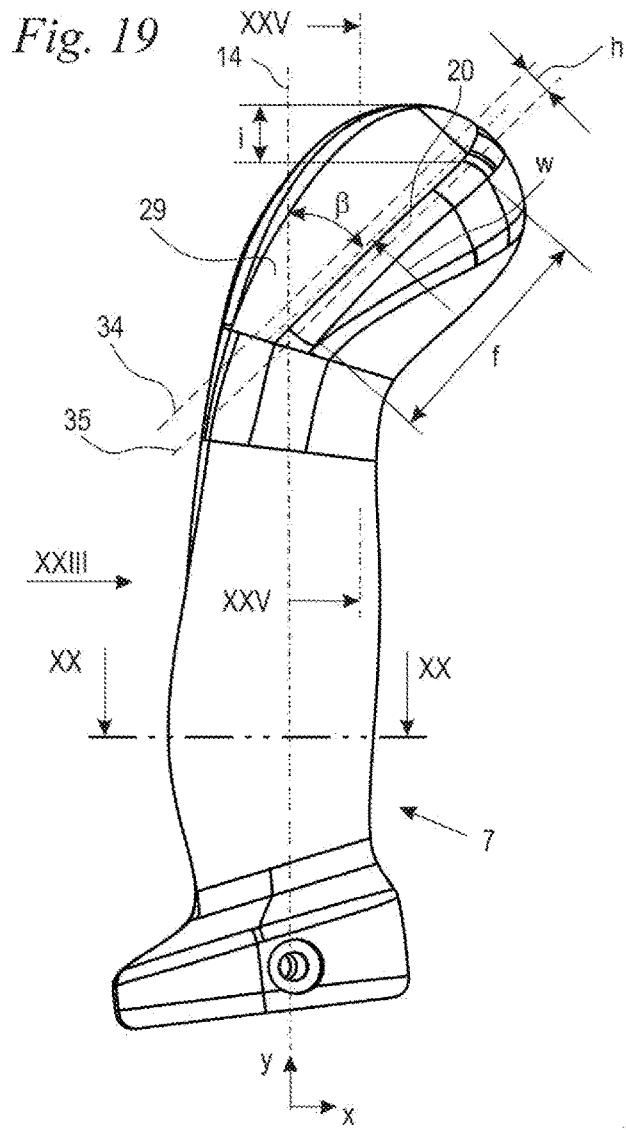
FIG. 19 is a side view of the second handle.

As illustrated in FIG. 19, the thumb support surface 20 is positioned in relation to the longitudinal axis 14 at an angle β. The angle β amounts to at least 20° and at most 70° for the second handle 7 also. In the embodiment, the angle β for the second handle 7 is slightly greater than the angle β for the first handle 6. Since no third operating element 13 must be provided at the second handle 7 adjacent to the thumb support surface 20, the orientation of the thumb support surface 20 can be selected more freely. The thumb support surface 20 of the second handle 7 is positioned between the planes 34 and 35 which advantageously comprise a distance h of less than 3 mm, in particular of less than 2 mm, in relation to each other. The thumb support surface 20 in the embodiment is slightly concavely curved. Convex sections adjoin the concave section. The curved portion of the thumb support surface 20 comprises at every point thereof a radius w that amounts to at least 10 mm, in particular at least 15 mm. The smallest radius w of the second handle 7 is in particular smaller than the smallest radius w of the first handle 6. Also, a flat configuration of the thumb support surface 20 can be advantageous. The thumb support surface 20 comprises a distance e in relation to the free end 10. The distance e amounts to at least 1 cm for the second handle 7 in the embodiment. The thumb support surface 20 comprises a length f that amounts to at least 2.5 cm, in particular at least 3 cm. The thumb support surface 20 comprises a width g that amounts to advantageously at least 8 mm, in particular at least 1 cm.

In FIG. 20, the configuration of the heel of hand support 33 is illustrated in detail. The heel of hand support 33 forms a heel of hand support surface 36 which extends at the rear side 29 of the second handle 7. The heel of hand support surface 36 is approximately flat and can be slightly concavely curved in a section plane parallel to the longitudinal axis 14. Also a convexly curved portion is possible. The maximum distance o and its ratio to the diameter p correspond to that of the first handle 6. As illustrated in FIG. 20, the heel of hand support surface 36 is slanted by an angle δ in relation to the z-y plane in the illustrated section plane perpendicular to the y axis. The angle δ of the heel of hand support surface 36 of the second handle 7 can be larger than the angle δ for the first handle 6. Same angles δ can also be provided.

Figure 21:
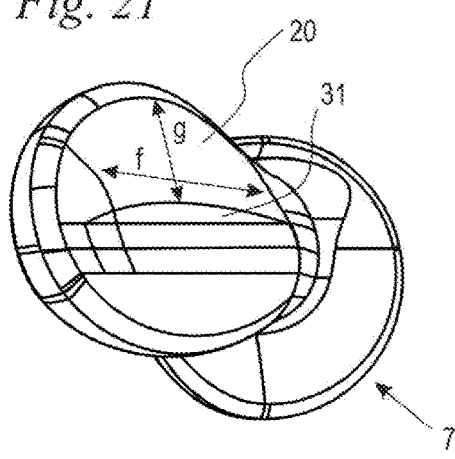
FIG. 21 is a perspective illustration of the second handle.
Figure 22:
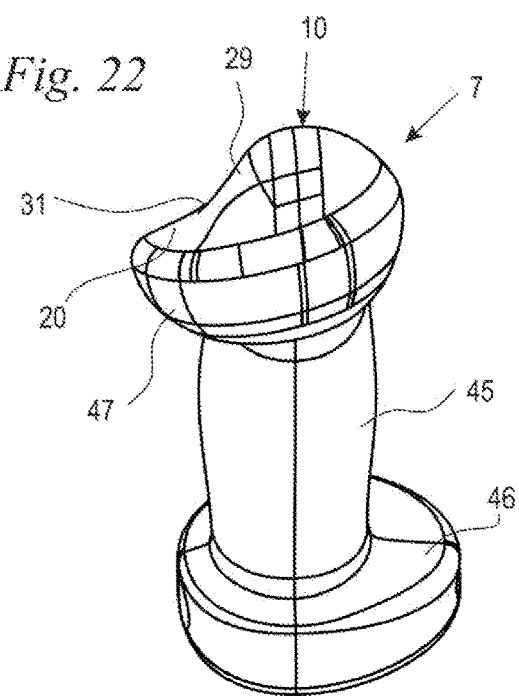
FIG. 22 is another perspective illustration of the second handle.

In FIG. 21, the width g and the length f of the thumb support surface 20 can be seen well. In FIG. 22, it is shown that the curved portion 31 with which the support surface 20 passes into the inner side 29 is significantly larger than at the first handle 6. This can also be seen in FIG. 23 and FIG. 25. As shown in FIG. 25, the radius s of the curved portion 31 is advantageously larger than 2 mm, in particular larger than 5 mm. In a section plane parallel to the longitudinal axis 14, the thumb support surface 20 is positioned in relation to the longitudinal axis 14 at an angle γ which corresponds to the angle γ which has been described in connection with the first handle 6.

As illustrated in FIG. 24, the heel of hand support surface 36 is arranged in the first half 48 of the grip section 45. As also shown in FIG. 24, the heel of hand support surface 36 has a length k measured in the direction of the longitudinal axis 14. The length k amounts advantageously to at least 2.5 cm, in particular at least 3.5 cm. The second handle 7 comprises a length u indicated in FIG. 24. The length u of the second handle 7 is advantageously smaller than the length u of the first handle 6.

Figure 26:
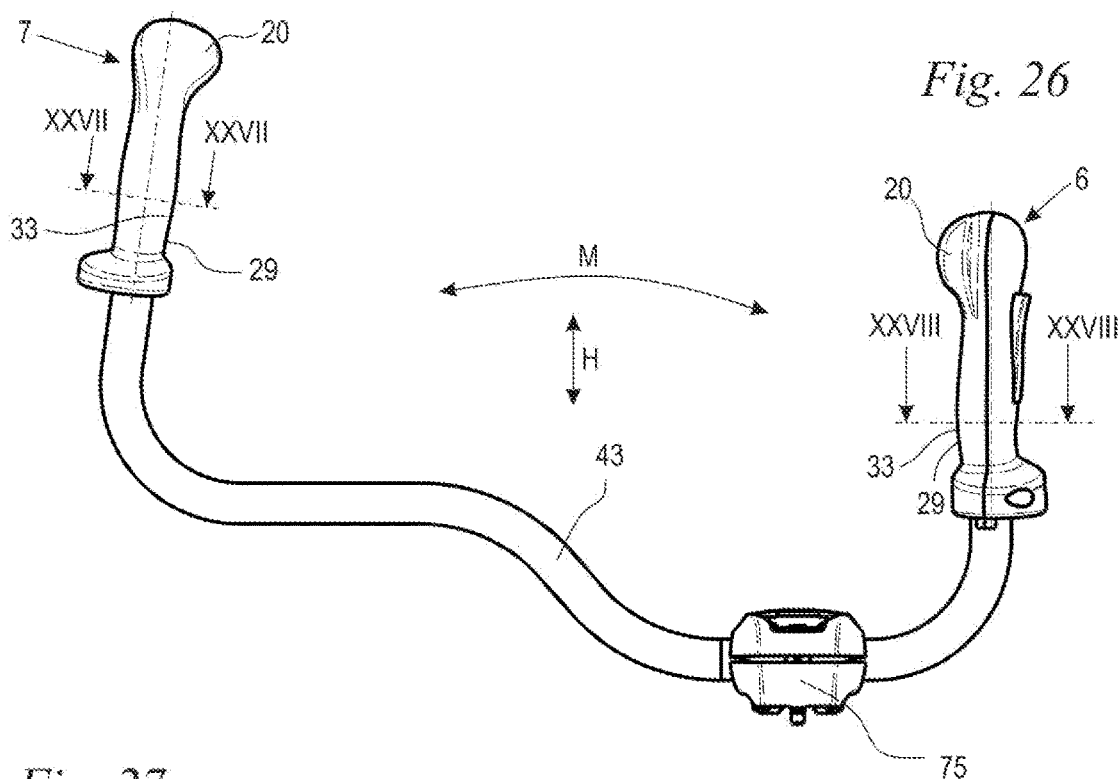
FIG. 26 is a side view of a handlebar of a trimmer with two handles.

In FIG. 26, the configuration of the handlebar 5 is illustrated. At the bar 43, a fastening device 75 is illustrated by means of which the bar 43 can be secured at the guide tube 2. The fastening device 75 enables advantageously an adaptation of the position of the bar 43 in length direction of the guide tube 2 and/or pivoting of the bar 43 about the fastening device 75 in order to make the slant of the bar 43 and the slant of the handles 6 and 7 adjustable. In FIG. 26, also the thumb support surfaces 20 of the two handles 6 and 7 are illustrated. In FIG. 26, the movement directions M for a mowing operation and H for the chopping operation are indicated.

Figure 27:
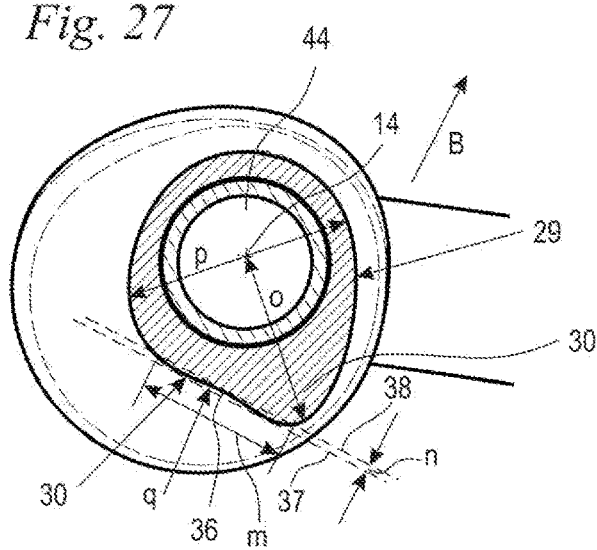
FIG. 27 is a section along the line XXVII-XXVII in FIG. 26 through the second left handle.
Figure 28:
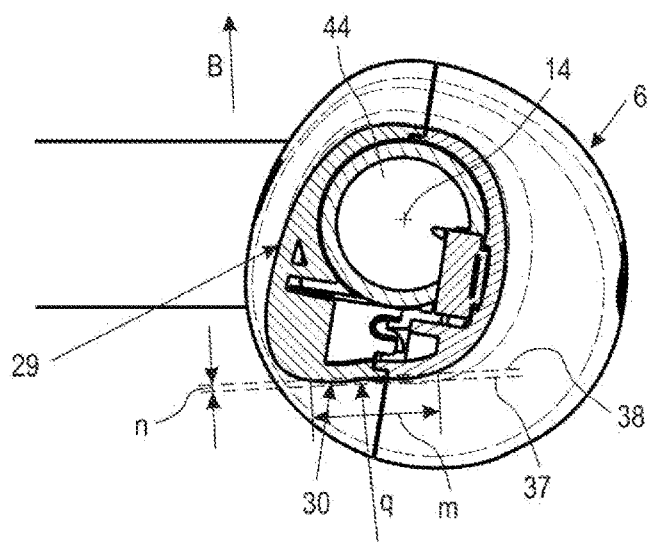
FIG. 28 is a section along the line XXVIII-XXVIII in FIG. 26 through the first right handle.

FIGS. 27 and 28 show each a section through the heel of hand support 33 in the region in which the heel of hand support 33 has the maximum distance o in relation to the longitudinal axis 14.

FIG. 27 shows that the heel of hand support surface 36 of the second handle 7 comprises a width m. The width m amounts advantageously to at least 8 mm, in particular at least 1 cm. Across the width m and the length k, the hand of heel support surface 36 is positioned between two planes 37 and 38 that extend parallel to each other. The two planes 37 and 38 comprise a distance n in relation to each other that is advantageously less than 3 mm. The length k and the width m are measured in the region of the heel of hand support surface 36 which is positioned between the planes 37 and 38.

As illustrated in FIG. 28, the heel of hand support surface 36 of the first handle 6 comprises a width m that amounts advantageously to at least 8 mm, in particular at least 1 cm. The heel of hand support surface 36 is positioned between two parallel planes 37 and 38 whose distance n from each other amounts to at most 3 mm. The length k (FIG. 3) and the width m are measured in the region of the heel of hand support surface 36 that is located between the planes 37 and 38.

As also shown in FIGS. 27 and 28, the heel of hand support surfaces 36, in particular the heel of hand support surface 36 of the first handle 6, comprises a radius q in the illustrated section plane perpendicular to the longitudinal axis 14; the radius q amounts to at least 10 mm, in particular at least 15 mm, at every point thereof. The heel of hand support surface 36 can extend in a concave and/or convex shape in the illustrated section plane. An extension that is flat at least in sections or a continuous flat extension can be advantageous also. Smaller radii can be provided also in particular for the heel of hand support surface 36 of the second handle 7. The radius q of the middle concave region amounts advantageously to at least 10 mm, in particular at least 15 mm. The convex regions adjoining in circumferential direction can have radii that are smaller than 10 mm.

Due to the orientation of the heel of hand support surface 36, a good force introduction in a force direction B is possible by means of the heel of hand support surface 36. The force directions B of the two handles 6 and 7 can extend inclined in relation to each other, as shown in FIGS. 27 and 28. The force direction B extends advantageously transversely to the heel of hand support surface 36. The force direction B extends in particular perpendicularly to the planes 37 and 38. The heel of hand support surface 36 is advantageously oriented transversely to, in particular perpendicularly to, the direction toward the tool unit 3. In this way, forces in the direction toward the tool unit 3 can be introduced well by means of the heel of hand support surface 36.

By pushing on the heel of hand support surface 36 of one of the handles 6, 7 and holding or pulling at the other one of the handles 6, 7, a force can be introduced simply and ergonomically in the movement direction M for a mowing operation. By pushing on the heel of hand support surface 36, in particular pressing on the heel of hand support surfaces 36 of both handles 6, 7, the tool unit 3 can be pushed down and a force can be introduced well and ergonomically in this way in the movement direction H for the chopping operation.

The heel of hand support 33 is embodied as an elevation that extends at the inner side 29 and the rear side 30 of the shaft 8. The heel of hand support 33 is arranged for both handles 6, 7 at least partially, in particular completely, in the first half 48 of the respective handle 6, 7. As illustrated in FIG. 20 for the second handle 7, the handle 7 has a rubber coating 69. Advantageously, each handle 6, 7 comprises a rubber coating in at least one section, in particular across the entire outer surface of the shaft 8. In this way, improved grip of the hand 52 of the user 51 at the handle 6, 7 is achieved.

Further features of the second handle 7 correspond to the features of the first handle 6, and reference is being had to the description of handle 6 in this respect.

While specific embodiments of the invention have been shown and described in detail to illustrate the inventive principles, it will be understood that the invention may be embodied otherwise without departing from such principles.

What is claimed is:

1. A handle for a hand-guided power tool, the handle comprising:

a shaft comprising a fastening end and a free end, the fastening end configured to secure the handle on the power tool, wherein the handle has a longitudinal axis;

an outer side configured to at least partially support a palm of a hand of a user;

an inner side positioned opposite the outer side:

a first operating element supported at the shaft so as to be pivotable about a first pivot axis and a second operating element supported at the shaft so as to be pivotable about a second pivot axis;

wherein the first operating element comprises a first actuating section and is configured to control a drive motor of the power tool and wherein the second operating element is configured to prevent in a non-actuated position a control action of the first operating element on the drive motor;

wherein the second operating element in the non-actuated position comprises a second actuating section projecting from the shaft, wherein the second actuating section comprises a first end and a second end, wherein the first end of the second actuating section is positioned closer to the fastening end of the shaft than the second end of the second actuating section, and wherein the second end of the second actuating section is positioned closer to the free end of the shaft than the first end of the second actuating section; and wherein the second pivot axis is arranged closer to the first end of the second actuating section than to the second end of the second actuating section.

2. The handle according to claim 1, wherein the longitudinal axis of the handle is oriented perpendicularly to the first pivot axis and oriented perpendicularly to the second pivot axis, wherein the first pivot axis and the second pivot axis, viewed in a viewing direction along the longitudinal axis of the handle, are positioned at an angle of less than 180° in relation to each other.

3. The handle according to claim 1, wherein the longitudinal axis of the handle is oriented perpendicularly to the first pivot axis and oriented perpendicularly to the second pivot axis, wherein the first pivot axis and the second pivot axis, viewed in a viewing direction along the longitudinal axis of the handle, are positioned at an angle of less than 120° in relation to each other.

4. The handle according to claim 1, wherein the actuating section of the second operating element in an actuated position of the second operating element at no point thereof projects by more than 3 mm past an outer contour of the shaft.

5. The handle according to claim 1, wherein the first actuating section of the first operating element in a non-actuated position projects from the shaft, wherein the first actuating section of the first operating element comprises a first end and a second end, wherein the first end of the first actuating section is positioned closer to the fastening end of the shaft than the second end of the first actuating section, and wherein the second end of the first actuating section is positioned closer to the free end of the shaft than the first end of the first actuating section, and wherein the first pivot axis is arranged closer to the second end of the first actuating section than to the first end of the first actuating section.

6. The handle according to claim 1, wherein at least one of the first and second actuating sections comprises a distance of less than 7 cm in relation to the free end of the shaft.

7. The handle according to claim 1, wherein the first actuating section and the second actuating section overlap each other across a length section of the shaft, wherein a length of the length section of the shaft, measured in a direction of the longitudinal axis of the handle, amounts to at least 30% of a length of the first actuating section, measured in the direction of the longitudinal axis of the handle.

8. The handle according to claim 1, wherein the first actuating section and the second actuating section overlap each other across a length section of the shaft, wherein a length of the length section of the shaft, measured in a direction of the longitudinal axis of the handle, amounts to at least 50% of a length of the first actuating section, measured in the direction of the longitudinal axis of the handle.

9. The handle according to claim 1, wherein the first operating element is arranged at a front side of the handle, wherein the front side of the handle extends in a circumferential direction of the shaft between the inner side and the outer side and is configured to support fingers of the user, and wherein the second operating element is arranged at the outer side.

10. The handle according to claim 1, wherein the free end of the shaft provides a support surface for a hand of a user.

11. The handle according to claim 10, wherein the support surface passes with a continuous rounded portion into a rear side of the handle, wherein the rear side of the handle extends in a circumferential direction of the shaft between the inner side and the outer side.

12. The handle according to claim 11, wherein, viewed in a side view looking at the outer side, the rounded portion comprises at every point thereof a radius of at least 1.5 cm.

13. The handle according to claim 11, wherein, viewed in a side view looking at the outer side, the rounded portion comprises at every point thereof a radius of at least 2 cm.

14. The handle according to claim 1, further comprising a third operating element, wherein the third operating element is arranged at the inner side, wherein the third operating element comprises an actuating position, wherein the third operating element, when moved from a non-actuated position to an actuated position, begins to carry out an actuating stroke in the actuating position, and wherein the third operating element in the actuating position, viewed in a direction along the longitudinal axis of the handle toward the fastening end, projects by at most 1 mm past an outer contour of the handle.

15. The handle according to claim 1, further comprising a third operating element, wherein the third operating element is arranged at the inner side, wherein the third operating element comprises an actuating position, wherein the third operating element, when moved from a non-actuated position to an actuated position, begins to carry out an actuating stroke in the actuating position, and wherein the third operating element in the actuating position, viewed in a direction along the longitudinal axis of the handle toward the fastening end, is positioned behind an outer contour of the handle.

16. The handle according to claim 15, wherein the third operating element in the non-actuated position projects at least one side past a contour of the shaft.

17. The handle according to claim 15, wherein the third operating element comprises a side facing the fastening end, wherein the side facing the fastening end projects in the non-actuated position of the operating element past a contour of the shaft.

18. A trimmer comprising:
a guide tube;
a tool unit connected to an end of the guide tube;
a handlebar comprising a bar secured to the guide tube and further comprising handles, wherein each handle is arranged at a respective end of the bar;
wherein the handles each comprise a shaft comprising a fastening end and a free end, the fastening end configured to secure the handle to the end of the bar;
wherein the handles each comprise a front side facing the tool unit end and an oppositely positioned rear side;
wherein the handles each comprise an inner side and an outer side, wherein the inner sides face each other and wherein the outer sides face away from each other;
wherein one of the handles comprises a first operating element supported at the shaft so as to be pivotable about a first pivot axis and further comprises a second operating element supported at the shaft so as to be pivotable about a second pivot axis:

wherein the first operating element is configured to control a drive motor of the trimmer and wherein the second operating element is configured to prevent in a non-actuated position a control action of the first operating element on the drive motor; and wherein the second operating element in the non-actuated position comprises an actuating section projecting from the shaft, wherein the actuating section comprises a first end and a second end, wherein the first end of the actuating section is positioned closer to the fastening end of the shaft than the second end of the actuating section, and wherein the second end of the actuating section is positioned closer to the free end of the shaft than the first end of the actuating section, and wherein the second pivot axis is arranged closer to the first end of the actuating section than to the second end of the actuating section.

* * * * *